US 7,415,406 B2

(12) United States Patent
Huang et al.

(10) Patent No.: US 7,415,406 B2
(45) Date of Patent: Aug. 19, 2008

(54) SPEECH RECOGNITION APPARATUS, SPEECH RECOGNITION METHOD, CONVERSATION CONTROL APPARATUS, CONVERSATION CONTROL METHOD, AND PROGRAMS FOR THEREFOR

(75) Inventors: Shengyang Huang, Tokyo (JP); Hiroshi Katukura, Tokyo (JP)

(73) Assignee: P to PA, Inc., Tokyo (JP)

( * ) Notice: Subject to any disclaimer, the term of this patent is extended or adjusted under 35 U.S.C. 154(b) by 843 days.

(21) Appl. No.: 10/870,117

(22) Filed: Jun. 17, 2004

(65) Prior Publication Data

US 2005/0021331 A1    Jan. 27, 2005

(30) Foreign Application Priority Data

Jun. 20, 2003    (JP)    ............................. 2003-177356

(51) Int. Cl.
G06F 17/27    (2006.01)
(52) U.S. Cl. ............................... 704/9; 704/3; 704/257; 704/275; 704/251; 704/231
(58) Field of Classification Search ...................... 704/3, 704/9, 257, 275, 251, 231
See application file for complete search history.

(56) References Cited

U.S. PATENT DOCUMENTS

| | | | |
|---|---|---|---|
| 5,225,981 A * | 7/1993 | Yokogawa ...................... | 704/2 |
| 5,937,383 A | 8/1999 | Ittycheriah et al. | |
| 6,101,492 A * | 8/2000 | Jacquemin et al. .............. | 707/3 |
| 6,324,513 B1 * | 11/2001 | Nagai et al. .................. | 704/275 |
| 6,411,924 B1 * | 6/2002 | de Hita et al. .................. | 704/9 |
| 6,901,402 B1 * | 5/2005 | Corston-Oliver et al. ..... | 707/101 |
| 7,020,607 B2 * | 3/2006 | Adachi ........................ | 704/257 |
| 2002/0133347 A1 * | 9/2002 | Schoneburg et al. ........ | 704/257 |
| 2002/0143776 A1 * | 10/2002 | Hirose et al. .................. | 707/10 |
| 2004/0107102 A1 * | 6/2004 | Chung et al. ................. | 704/260 |

FOREIGN PATENT DOCUMENTS

| | | |
|---|---|---|
| EP | 0543329 | 5/1993 |
| JP | 1-185180 | 7/1989 |
| JP | 2002-366190 | 12/2002 |
| WO | WO-0038175 | 6/2000 |

* cited by examiner

Primary Examiner—Vijay B Chawan
(74) Attorney, Agent, or Firm—Jordan and Hamburg LLP

(57) ABSTRACT

An automatic conversation apparatus includes a speech recognizing unit receiving a speech signal and outputting characters/character string corresponding to the speech signal as a recognition result; a speech recognition dictionary storing unit storing a language model for determining candidates corresponding to the speech signal; a conversation database storing plural pieces of topic specifying information; a sentence analyzing unit analyzing the characters/character string outputted from the speech recognizing unit; and a conversation control unit storing a conversation history and acquiring an answer sentence based on an analysis result of the sentence analyzing unit. Speech recognizing unit includes a collating unit that outputs plural candidates based on the speech recognition dictionary storing unit; and a candidate determining unit comparing the plural candidates outputted from collating unit with topic specifying information corresponding to the conversation history with reference to the conversation database and outputs one candidate based on the comparison.

19 Claims, 15 Drawing Sheets

| | MEANING | EXAMPLE OF DATA |
|---|---|---|
| DA | DECLARATION AFFIRMATIVE SENTENCE | I LIKE SATO |
| LA | LOCATION AFFIRMATIVE SENTENCE | I LIKE SERIOUS FACE AT BAT |
| NA | NEGATION AFFIRMATIVE SENTENCE | I DON'T LIKE TO TALK TO A PERSON WHO DOESN'T LIKE SATO |
| DQ | DECLARATION INTERROGATIVE SENTENCE | DO YOU LIKE SATO? |
| LQ | LOCATION INTERROGATIVE SENTENCE | WHICH PART OF SATO AT BAT YOU LIKE? |
| NQ | NEGATION INTERROGATIVE SENTENCE | IT IS A LIE THAT YOU LIKE SATO, ISN'T IT? |
| ... | ... | ... |

FIG.6

| TYPE OF JUDGMENT | DICTIONARY TO BE USED |
|---|---|
| D JUDGMENT | DEFINITIONAL EXPRESSION DICTIONARY |
| N JUDGMENT | NEGATIONAL EXPRESSION DICTIONARY |
| ... | ... |

| TOPIC SPECIFYING INFORMATION (A MOVIE TITLE) | TOPIC TITLE | | |
|---|---|---|---|
| | FIRST SPECIFYING INFORMATION | SECOND SPECIFYING INFORMATION | THIRD SPECIFYING INFORMATION |
| | A MOVIE | * | * |
| | A MOVIE | * | INTERESTING |
| ... | ... | ... | ... |
| ... | ... | ... | ... |

<<TYPE OF ANSWER SENTENCE>>

| TYPE | CONTENTS |
|---|---|
| D | DECLARATION SENTENCE |
| T | DECLARATION SENTENCE IS SENTENCE CONSTITUTED BY TEMPORAL CONCEPT SUCH AS "WHEN" |
| L | DECLARATION SENTENCE IS SENTENCE CONSTITUTED BY LOCATIONAL CONCEPT SUCH AS "WHERE" |
| N | SENTENCE AT THE TIME WHEN DECLARATION SENTENCE IS DENIED |
| ... | ... |

| TOPIC SPECIFYING INFORMATION (SATO) NARROWER TERM = HOME RUN BROADER TERM = AMATEUR BASEBALL SYNONYM = PANDA SATO, PLAYER SATO, PANDA | | | |
|---|---|---|---|
| | | ANSWER TYPE | CONTENTS |
| TOPIC TITLE1-1 SATO, LIKE | ANSWER SENTENCE1-1 | DA | I LIKE SATO, TOO |
| | | TA | I LIKE SATO AT BAT |
| | ANSWER SENTENCE1-2 | ... | ... |
| TOPIC TITLE1-2 | ... | | |

SPEECH RECOGNITION APPARATUS, SPEECH RECOGNITION METHOD, CONVERSATION CONTROL APPARATUS, CONVERSATION CONTROL METHOD, AND PROGRAMS FOR THEREFOR

The present disclosure relates to subject matters contained in Japanese Patent Application No. 2003-177356 filed on Jun. 20, 2003, which are expressly incorporated herein by reference in its entireties.

BACKGROUND OF THE INVENTION

1. Field of the Invention

The present invention relates to a speech recognition apparatus, a speech recognition method, a conversation control apparatus, a conversation control method, and programs therefor. More specifically, the present invention relates to a speech recognition apparatus, a speech recognition method, a conversation control apparatus, a conversation control method, and programs therefor that are capable of preferentially selecting candidates, which conform to or relate to topics of conversation in the past, utilizing conversation histories or the like in the past.

2. Description of the Prior Art

As a conventional method for recognizing a specific vocabulary in continuous speech recognition, word spotting for extracting a recognition candidate word, which is set in advance, from continuous conversation speech has been devised. It has been confirmed that, with this method, the word can be extracted efficiently if the number of words to be set is small. However, it is known that accuracy of the extraction falls as the number of words to be set increases. In addition, since a word other than the set words cannot be recognized with this method, the method cannot be used for an application that requires continuous speed recognition for a vocabulary. Therefore, there is a need for a method of recognizing mainly a large quantity of designated words in a framework of large vocabulary continuous speech recognition.

The speech recognition is a matter of estimating what a speaker has spoken from an observed speech signal. If the speaker has uttered a certain word and a characteristic parameter x has been obtained by characteristic extraction, w maximizing a posterior probability $p(w|x)$ only has to be calculated on the basis of the theory of pattern recognition. Usually, since it is difficult to directly finding the posterior probability $p(w|x)$, instead of finding w maximizing the posterior probability $p(w|x)$, w maximizing $p(x|w)P(w)$ is calculated on the basis of the Bayes' theorem $(p(w|x)=p(x|w)p(w)/p(x))$ (in this case, $p(x)$ does not depend on w). $P(x|w)$ is calculated from data that is obtained by learning as a probability of occurrence of a characteristic parameter in advance according to an acoustic model with a phoneme or the like as a unit. $P(w)$ is calculated according to a language model with a word or the like as a unit.

As a framework for the large vocabulary continuous speech recognition, it has been confirmed that a method of calculating and comparing likelihoods for an inputted speech signal using a phoneme Hidden Markov Model and a statistical language model is effective. As the statistical language model, usually, it is a general practice to find a chain probability between two words or among three words for a large quantity of text data, which are prepared in advance, and using the chain probability at the time of speech recognition.

In general, in the speech recognition system as described above, in order to narrow down a large number of utterance candidates that are generated because speech cannot be recognized definitely, a "language model obtained by modeling an association among words" is used to extract an utterance candidate with a high recognition rate as an optimal utterance candidate. As such a language model, a statistical language model, which is established utilizing a corpus (language/speech database), is disclosed in Japanese Patent Application Laid-Open No. 2002-366190, and a language mode, which takes into account word pair restriction or the like grammatically, is disclosed in Japanese Patent Application Laid-Open No. 11-85180.

Such language modes are referred to as "conventional language models". A language model, which associates words utilizing a "conversation history" for the narrowing-down, has not been proposed.

However, the speech recognition system using the conventional language models has a problem in that the recognition rate falls when short speech such as "chat" is inputted repeatedly or when an abbreviated sentence is used.

For example, a case in which speech uttered by a speaker concerning a topic of film shooting is subjected to speech recognition will be considered. When a user utters "kantoku" (director), the speech recognition system outputs plural utterance candidates, namely, (1) "kantaku", (2) "kataku", and (3) "kantoku", from a speech signal generated by this utterance, and selects (1) "kantaku" with the highest recognition rate. Thus, even if a content, which is the same as speech (in this case, "kantoku") of the user, is included in the utterance candidate, the speech recognition system cannot select the word as an optimal utterance candidate.

Therefore, it is considered necessary to establish a "mechanism (speech recognition system taking into account a conversation history)", which utilizes a conversation history or the like in the past to select a candidate as an appropriate word even if a recognition rate of the candidate is judged low, and increase a speech recognition rate.

SUMMARY OF THE INVENTION

As means for solving the above-described problems, the present invention has characteristics as described below.

A first aspect of the present invention is proposed as a speech recognition apparatus. This speech recognition apparatus includes: speech recognizing means (a speech recognizing unit); speech recognition dictionary storing means (a speech recognition dictionary storing unit); conversation database means (a conversation database) that has stored therein plural pieces of topic specifying information; and conversation history storing memory (a conversation control unit) that stores subjects included in conversations in the past. The speech recognizing means (speech recognizing unit) is characterized by selecting plural candidates corresponding to a speech signal on the basis of contents stored in the speech recognition dictionary storing means (speech recognition dictionary storing unit), selecting a candidate corresponding to topic specifying information, which corresponds to a conversation history stored in the conversation history storing means (conversation control unit), and outputting the candidate as a recognition result.

It is highly likely that topic specifying information corresponding to a conversation history corresponds to a content spoken by a speaker. For example, when the speaker talks about the baseball, a word "kantoku" (manager) is stored as topic specifying information corresponding to a conversation history (baseball). In such a case, if "kantaku", "kataku", and "kantoku" are obtained as plural candidates, the candidate "kantoku" corresponding to the topic specifying information "kantoku", which corresponds to the conversation history (baseball), is outputted as a recognition result. In this way, the speech recognition apparatus in accordance with this aspect operates so as to output a recognition result conforming to a topic of conversation.

A second aspect of the present invention is proposed as a speech recognition apparatus. This speech recognition apparatus includes: speech recognizing means (speech recognizing unit) that receives a speech signal; speech recognition dictionary storing means (a speech recognition dictionary storing unit) that stores a model for determining a candidate corresponding to the speech signal; conversation database means (a conversation database) that has stored therein plural pieces of topic specifying information; and conversation history storing means (a conversation control unit) that stores a conversation history. In this speech recognition apparatus, the speech recognizing means (speech recognizing unit) is characterized by including: a word collating means (word collating unit) that outputs plural candidates with reference to the speech recognition dictionary storing means (speech recognition dictionary storing unit) on the basis of the inputted speech signal; and a candidate determining unit that compares the plural candidates outputted from the word collating means (word collating unit) and topic specifying information corresponding to a conversation history with reference to the conversation database means (conversation database) and outputs any one of the candidates as a recognition result on the basis of a result of the comparison. A model stored by the speech recognition dictionary storing means (speech recognition dictionary storing unit) is an acoustic model, a language model, a statistical language model (Hidden Markov Model (HMM)), or a combination of two or more of the models. The model may be any one of the foregoing as long as the model is capable of selecting plural candidates corresponding to speech on the basis of acoustic characteristics of the speech.

As in the first aspect, the speech recognition apparatus in accordance with the second aspect operates to output a recognition result conforming to (or relating to) a content, which would be talked about by a speaker, in order to select a candidate corresponding to topic specifying information, which corresponds to a conversation history, out of plural candidates.

In addition, in the speech recognition apparatus in accordance with the second aspect, the conversation database means (conversation database) may store first topic specifying information relating to a subject of a conversation and second topic specifying information not relating to the subject of the conversation. The candidate determining means may compare the plural candidates and the first topic specifying means corresponding to the conversation history to output any one of the plural candidates as a recognition result. The first topic specifying information is, for example, meaningful topic specifying information (e.g., "baseball", "movie"), and the second topic specifying information is, for example, meaningless topic information (e.g., "Hello", "I see").

As described above, the speech recognition apparatus in accordance with this aspect outputs any one of the plural candidates as a recognition result using only the first topic specifying information to thereby operate to avoid outputting a candidate, which does not relate to a topic, as a recognition result and further improve a recognition rate.

A third aspect of the present invention is proposed as a speech recognition method for outputting characters or a character string, which corresponds to inputted speech, as a recognition result for the speech. This speech recognition method is characterized by including the steps of: analyzing acoustic characteristics from a speech signal obtained from inputted speech; outputting plural candidates on the basis of the acoustic characteristics; acquiring topic specifying information corresponding to a conversation history stored in advance; and comparing the plural candidates and the acquired topic specifying information to output any one of the plural candidates as a recognition result.

In order to output the plural candidates on the basis of the acoustic characteristics, candidates only has to be selected using an acoustic model, a language model, a statistical language model (Hidden Markov Model (HMM)), or a combination of two or more of the models. A model used here may be any one of the foregoing as long as the model is capable of selecting plural candidates corresponding to speech on the basis of acoustic characteristics of the speech.

In addition, in the method in accordance with the third aspect, the topic specifying information may consist of first topic specifying information relating to a topic of a conversation and second topic specifying information not relating to the topic of the conversation. The topic specifying information to be compared with the plural candidates in the step of outputting a candidate as a recognition result maybe limited to the first topic specifying information. In this way, the speech recognition method in accordance with this aspect acts so as to avoid outputting a candidate, which does not relate to a topic, as a recognition result and further improve a recognition rate.

A fourth aspect of the present invention is proposed as a conversation control apparatus that receives speech and outputs an answer sentence corresponding to the speech. This conversation control apparatus includes: a speech recognizing unit (speech recognizing unit) that receives a speech signal and outputs characters or a character signal corresponding to the speech signal as a recognition result; a speech recognition dictionary storing unit (speech recognition dictionary storing unit) that stores a model for determining a candidate corresponding to the speech signal; a conversation database that has stored therein plural pieces of topic specifying information; a sentence analyzing unit that analyzes the characters or the character string outputted from the speech recognizing unit (speech recognizing unit); and a conversation control unit that stores a conversation history and acquires a replay sentence on the basis of an analysis result of the sentence analyzing unit. In this conversation control apparatus, the speech recognizing unit (speech recognizing unit) is characterized by including: a word collating means (word collating unit) that outputs plural candidates with reference to the speech recognition dictionary storing unit on the basis of the inputted speech signal; and a candidate determining unit that compares the plural candidates outputted from the word collating means (word collating unit) and topic specifying information corresponding to a conversation history with reference to the conversation database means and outputs any one of the candidates as a recognition result on the basis of a result of the comparison.

Since the speech recognition unit selects from plural candidates a candidate corresponding to topic specifying information which corresponds to a conversation history, and thus the speech recognition unit outputs a recognition result conforming to (or relating to) a content which seems to be talked about by a speaker, the conversation control apparatus in accordance with this aspect operates such that an answer sentence, which is obtained on the basis of this recognition result, also conforms to (or relates to) the content that seems to be talked about by the speaker.

A fifth aspect of the present invention is proposed as a conversation control method for outputting an answer sentence according to inputted speech. This conversation control method is characterized by including the steps of: analyzing acoustic characteristics from a speech signal obtained from the inputted speech; outputting plural candidates on the basis of the acoustic characteristics; acquiring topic specifying information corresponding to a conversation history stored in advance; comparing the plural candidates and the acquired topic specifying information to output any one of the plural candidates as a recognition result; analyzing the recognition result to output an answer sentence corresponding to the topic specifying information, which corresponds to the conversation history, on the basis of a result of the analysis.

According to the conversation control method in this aspect, a recognition result conforming to (or relating to) a content which seems to be talked about by a speaker is selected a candidate corresponding to topic specifying information which corresponds to a conversation history, from plural candidates selected on the basis of the acoustic characteristics of the inputted speech, and thus the conversation control method in accordance with this aspect operates such that an answer sentence, which is obtained on the basis of this recognition result, also conforms to (or relates to) the content that would be talked about by the speaker.

Additional objects and advantages of the invention will be set forth in the description which follows, and in part will be obvious from the description, or may be learned by practice of the invention. The objects and advantages of the invention may be realized and obtained by means of the instrumentalities and combination particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 6 is a diagram showing types of uttered sentences;

FIG. 7 is a diagram showing an example of a dictionary that is used by an input judging unit;

FIG. 10 is a diagram showing an example of a structure of a topic title;

FIG. 11 is a diagram showing an example of types of answer sentences;

FIG. 12 is a diagram showing contents of "topic titles" and "answer sentences" belonging to "topic specifying information" that is established in the inside of the conversation database;

DESCRIPTION OF THE PREFERRED EMBODIMENTS

[A. First Embodiment]

A first embodiment of the present invention will be hereinafter explained with reference to the accompanying drawings.

[Example of a Structure of a Conversation Control Apparatus]

[1. Overall Structure]

Figure 1:
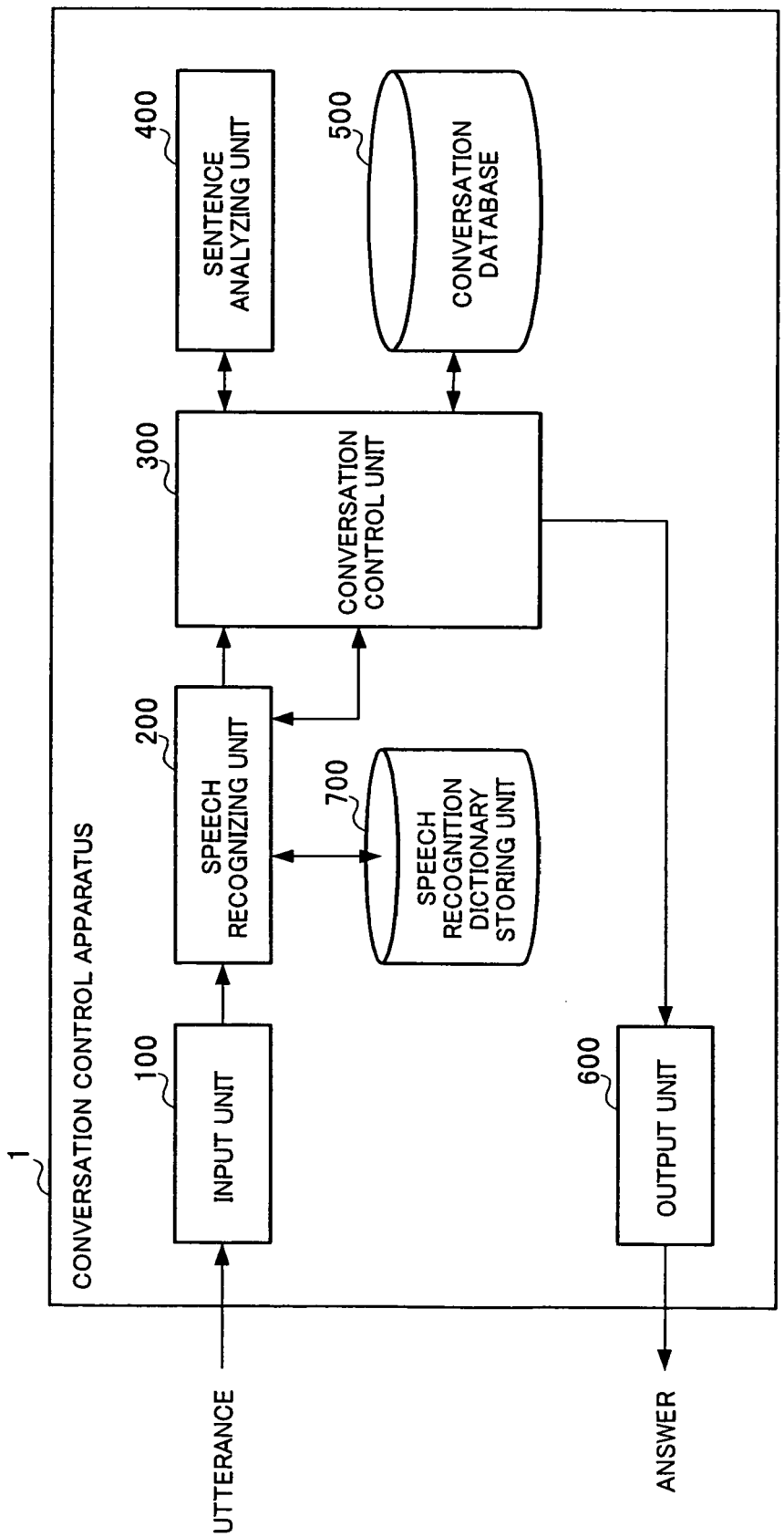
FIG. 1 is a functional block diagram showing a schematic structure of a conversation control apparatus.

FIG. 1 is a schematic diagram of a conversation control apparatus 1 in accordance with this embodiment. As shown in FIG. 1, the conversation control apparatus 1 includes: an input unit 100; a speech recognizing unit 200 serving as speech recognizing means; a conversation control unit 300 serving as conversation history storing means and conversation controlling means; a sentence analyzing unit 400 serving as sentence analyzing means; a conversation database 500 serving as conversation database means; an output unit 600; and a speech recognition dictionary storing unit 700 serving as speech recognition dictionary storing means.

[1-1. Input Unit]

Input unit 100 acquires input information that is inputted from a user. As an example of this input unit 100, there is a microphone. The input unit 100 outputs speech corresponding to an acquired uttered content to the speech recognizing unit 200 as a speech signal.

[1-2. Speech Recognizing Unit]

The speech recognizing unit 200 specifies a character string corresponding to the uttered content acquired by the input unit 100 on the basis of the uttered content. More specifically, the speech recognizing unit 200, which has received the input of the speech signal from the input unit 100, collates the speech signal with the dictionary stored in the speech recognition dictionary storing unit 700 and the conversation database 500 on the basis of the inputted speech signal.

[1-2-1. Example of a Structure of the Speech Recognizing Unit]

Figure 2:
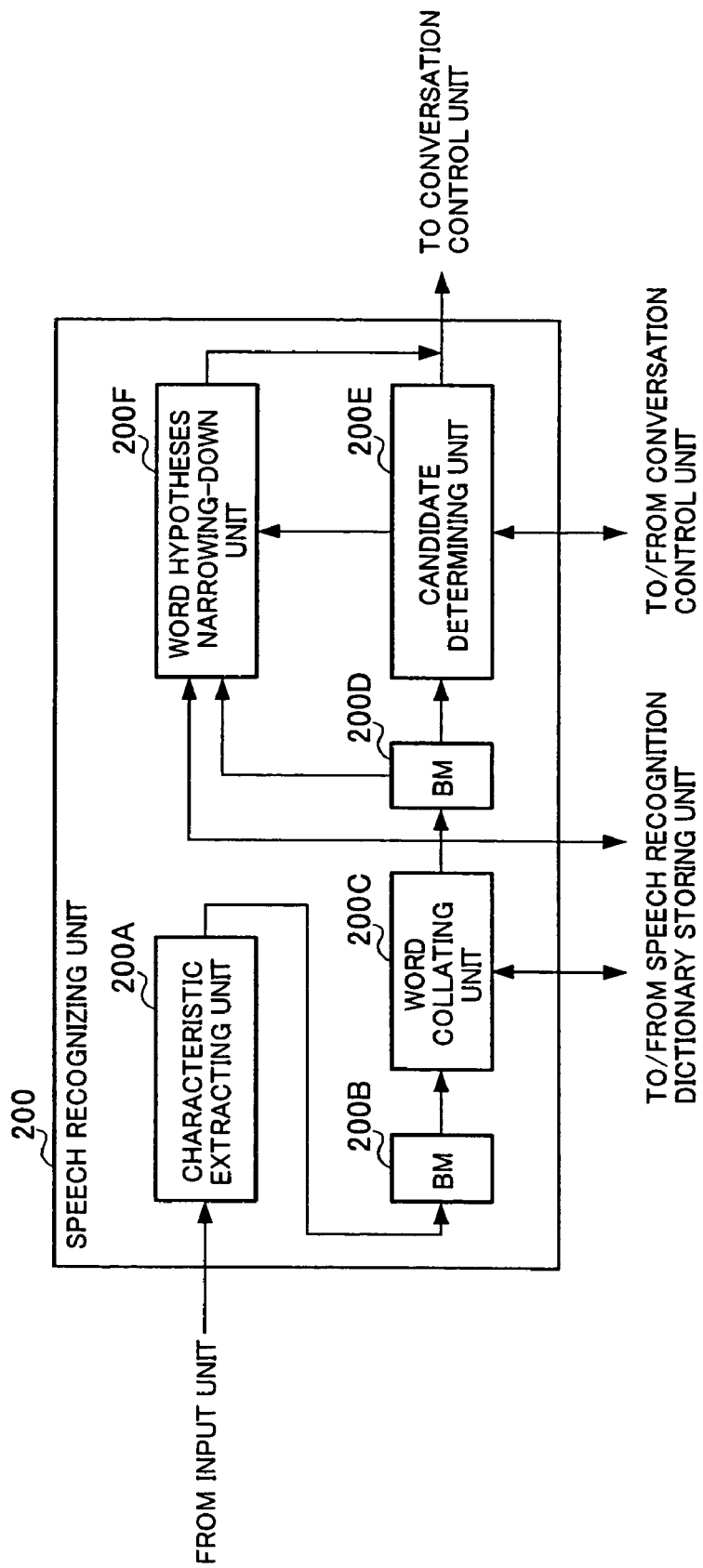
FIG. 2 is a functional block diagram showing an example of a structure of a speech recognizing unit.

FIG. 2 shows a functional block diagram showing an example of a structure of the speech recognizing unit 200. The speech recognizing unit 200 includes: a characteristic extracting unit 200A; a buffer memory (BM) 200B; a word collating unit 200C serving as collating means; a buffer memory (BM) 200D; a candidate determining unit 200E serving as candidate determining means; and a word hypotheses narrowing-down unit 200F serving as candidate hypotheses narrowing-down means. The word collating unit 200C and the word hypotheses narrowing-down unit 200F are connected to the speech recognition dictionary storing unit 700, and the candidate determining unit 200E is connected to the conversation database 500.

The speech recognition dictionary storing unit 200 connected to the word collating unit 200C stores a phoneme Hidden Markov Model (the Hidden Markov Model will be hereinafter referred to as HMM). The phoneme HMM is represented as including states, and the states include the following pieces of information, respectively: (a) a state number, (b) an acceptable context class, (c) a list of preceding states and following states, (d) a parameter of an output probability density distribution, and (e) a self-transition probability and a transition probability to a following state. Note that, since it is necessary to specify from which speaker each distribution derives, the phoneme HMM used in this embodiment is generated by converting a predetermined speaker mixed HMM. Here, an output probability density function is a mixed Gaussian distribution having 34-dimensional diagonal covariance matrix. In addition, the speech recognition dictionary storing unit 200 connected to the word collating unit 200C stores a word dictionary. The word dictionary stores a symbol string indicating reading that represents each word of the phoneme HMM.

Uttered speech of a speaker is inputted to a microphone or the like and converted into a speech signal, and then inputted to the characteristic extracting unit 200A. The characteristic extracting unit 200A subjects the inputted speech signal to A/D conversion, and then extracts and outputs a characteristic parameter. Various methods are possible as a method of extracting and outputting a characteristic parameter. As an example, there is a method of executing LPC analysis and extracts a 34-dimensional characteristic parameter including a logarithmic power, a 16th order cepstrum coefficient, a Δ logarithmic power, and a 16th order Δ cepstrum coefficient. A time series of the extracted characteristic parameter is inputted to the word collating unit 200C via the buffer memory (BM) 200B.

Word collating unit 200C uses a One Pass Viterbi decoding method, detects word hypotheses using the phoneme HMM and the word dictionary stored in the speech recognition dictionary storing unit 700 on the basis of data of the characteristic parameter inputted via the buffer memory 200B, and calculates likelihoods and outputs the same. Here, the word collating unit 200C calculates a likelihood in a word and a likelihood from start of utterance for each state of each HMM at each time. The likelihoods are held individually for each difference of an identification number of a word, a start time of a word, and a preceding word. In addition, for deletion of an amount of calculation processing, a grid hypothesis of a low likelihood of total likelihoods, which are calculated on the basis of the phoneme HMM and the word dictionary, may be deleted. Word collating unit 200C outputs information on detected word hypotheses and likelihoods thereof to the candidate determining unit 200E and the word hypotheses narrowing-down unit 200F via the buffer memory 200D together with time information (more specifically, for example, a frame number) from an utterance start time.

Candidate determining unit 200E compares the detected word hypotheses and topic specifying information in a predetermined conversation space with reference to the conversation control unit 500, judges whether there is a word hypothesis, which matches the topic specifying information in the predetermined conversation space, in the detected word hypotheses. If there is a word hypothesis matching the topic specifying information, the candidate determining unit 200E outputs the word hypothesis as a recognition result. On the other hand, if there is no word hypothesis matching the topic specifying information, the candidate determining unit 200E requests the word hypothesis narrowing-down unit 200F to narrow down the word hypotheses.

An example of an operation of the candidate determining unit 200E will be explained. It is assumed that the word collating unit 200C outputs plural word hypotheses "kantaku" (the word "kantaku" means reclamation by drainage in Japanese), "kataku" (the word "kataku" means a pretext in Japanese), and "kantoku" (the word "kantoku" means a director in Japanese) and likelihoods (recognition rates) thereof, a predetermined conversation space concerns a "movie", and topic specifying information thereof includes "kantoku" but does not include "kantaku" and "kataku". In addition, the likelihood of "kantaku" is the highest, the likelihood of "kantoku" is the lowest, and the likelihood of "kataku" is in the middle.

In the above-described situation, the candidate determining unit 200E compares the detected word hypotheses and the topic specifying information in the predetermined conversation space, judges that the word hypothesis "kantoku" matches the topic specifying information in the predetermined conversation space, and outputs the word hypothesis "kantoku" to the conversation control unit as a recognition result. With such processing, "kantoku (director)" relating to the current topic "movie" is selected preferentially over the word hypotheses "kantaku" and "kataku" having higher likelihoods (recognition rates). This makes it possible to output a speech recognition result conforming to a context of a conversation.

On the other hand, if there is no word hypothesis matching the topic specifying information, the word hypotheses narrowing-down unit 200F operates to output a recognition result in response to a request for narrowing down word hypotheses from the candidate determining unit 200E. Word hypotheses narrowing-down unit 200F refers to the statistical language model stored in the speech recognition dictionary storing unit 700 on the basis of the plural word hypotheses outputted from the word collating unit 200C via the buffer memory 200D, and with respect to word hypotheses of identical words with a same end time and different start times, narrows down the word hypotheses such that the word hypotheses are represented by one word hypothesis, which has a highest of all calculated likelihoods from an utterance start time until an end time of the word, for each top phoneme environment of the word. Then, The word hypotheses narrowing-down unit 200F outputs a word string of a hypothesis having a maximum likelihood among word strings of total hypotheses after the narrowing-down as a recognition result. In this embodiment, preferably, the top phoneme environment of the word to be processed means a row of three phonemes including a last phoneme of a word hypothesis preceding the word and first two phonemes of a word hypothesis of the word.

An example of words narrowing-down processing by the word hypotheses narrowing-down unit 200F will be explained. For example, it is assumed that, when an i-th word Wi consisting of a phoneme string a1, a2, . . . , an is placed next to an (i-1)-th word Wi-1, six hypotheses Wa, Wb, Wc, Wd, We, and Wf are present as word hypotheses of the word Wi-1. Here, it is assumed that a last phoneme of the former three word hypotheses Wa, Wb, and Wc is /x/, and a last phoneme of the latter three word hypotheses Wd, We, and Wf is /y/. Hypotheses other than a hypothesis with a highest total likelihood are deleted from hypotheses in which an end time te and a top phoneme environment are equal. Note that, since a fourth phoneme from the top has a different top phoneme environment, that is, a last phoneme of a preceding word hypothesis is not x but y, the fourth hypothesis from the top is not deleted. In other words, only one hypothesis is left for each last phoneme of a preceding word hypothesis.

In the above-described embodiment, the top phoneme environment of the word is defined as a row of three phonemes including a last phoneme of a word hypothesis preceding the word and first two phonemes of a word hypothesis of the word. The present invention is not limited to this. The top phoneme environment of the word may be a row of phonemes including a phoneme string of a preceding word hypothesis, which includes a last phoneme and a phone of at least one of continuous preceding word hypotheses, and a phoneme string, which includes a first phoneme of a word hypothesis of the word.

With respect to the above-described embodiment, the characteristic extracting unit 200A, the word collating unit 200C, the candidate determining unit 200E, and the word hypotheses narrowing-down unit 200F are constituted by, for example, a computer such as a digital computer. The buffer memories 200B and 200D and the speech recognition dictionary storing unit 700 are constituted by, for example, a storage such as a hard disk or a memory.

With respect to the above-described embodiment, speech recognition is performed using the word collating unit 200C and the word hypotheses narrowing-down unit 200F. The present invention is not limited to this and may include, for example, a phoneme collating unit, which refers to the phoneme HMM, and a speech recognizing unit, which performs speech recognition of a word with reference to the statistical language model using, for example, a One Pass DP algorithm.

In addition, in this embodiment, the speech recognizing unit 200 is explained as a part of the conversation control apparatus 1. However, the speech recognizing unit 200 may be an independent speech recognition apparatus that includes the speech recognizing unit 200, the speech recognition dictionary storing unit 700, and the conversation database 500.

[1-2-2. Example of an Operation of the Speech Recognizing Unit]

Figure 3:
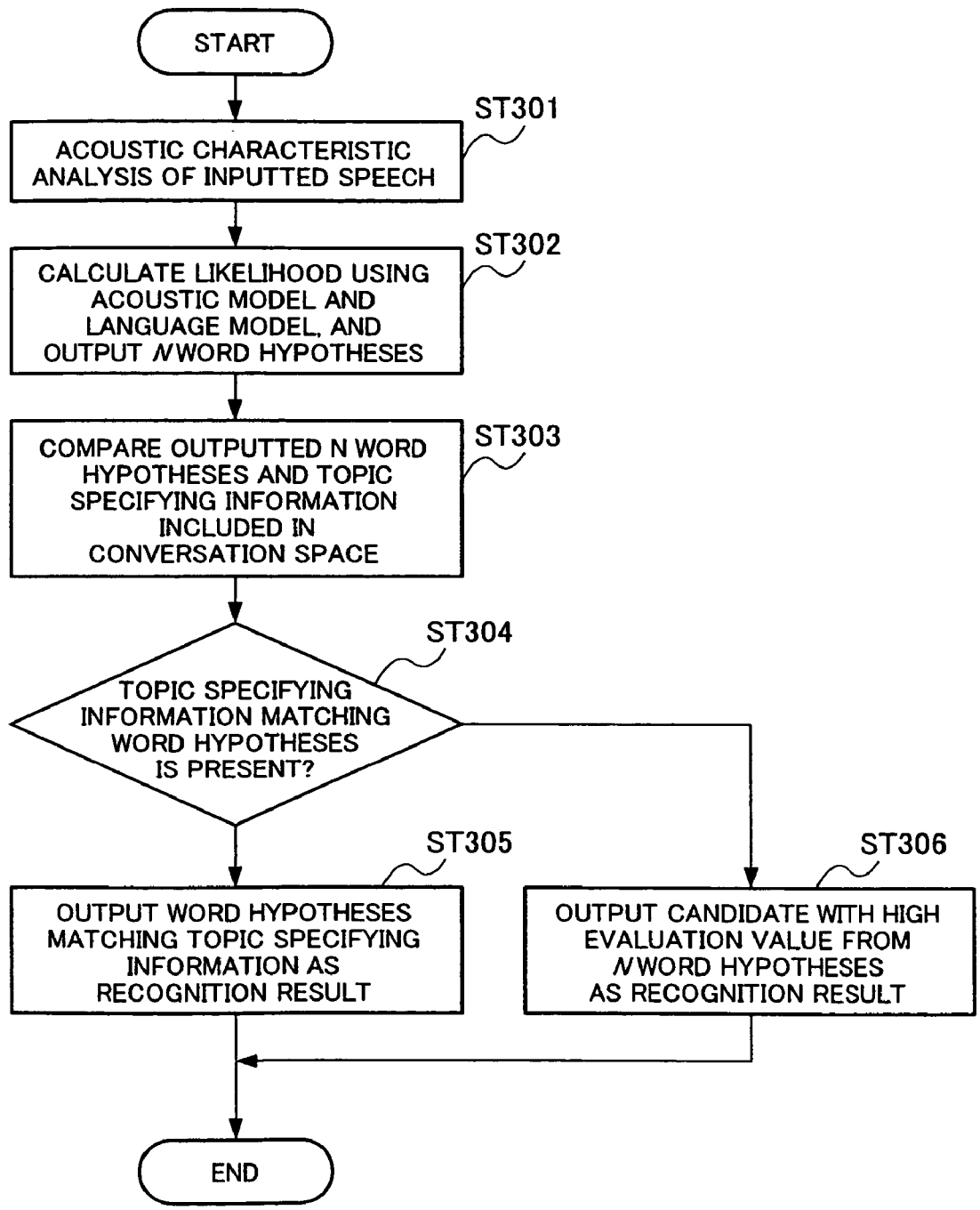
FIG. 3 is a flow diagram showing an example of an operation of the speech recognizing unit.

Next, an operation of the speech recognizing unit 200 will be explained with reference to FIG. 3. FIG. 3 is a flow diagram showing an example of an operation of the speech recognizing unit 200. Upon receiving a speech signal from the input unit 100, the speech recognizing unit 200 performs characteristic analysis of an inputted speech to generate a characteristic parameter (step S301). Next, the speech recognizing unit 200 compares this characteristic parameter and the phoneme HMM and the language model, which are stored in the speech recognition dictionary storing unit, to acquire a predetermined number of word hypotheses and likelihoods thereof (step S302). Next, the speech recognizing unit 200 compares the acquired predetermined number of word hypotheses and topic specifying information in a predetermined conversation space to judge whether there is a word hypothesis, which matches the topic specifying information in the predetermined conversation space, in the acquired predetermined number of word hypotheses (steps S303 and S304) If there is a word hypothesis matching the topic specifying information, the speech recognizing unit 200 outputs the word hypothesis as a recognition result (step S305). On the other hand, if there is not word hypothesis matching the topic specifying information, the speech recognizing unit 200 outputs a word hypothesis having a maximum likelihood as a recognition result in accordance with the likelihoods of the acquired word hypotheses (step S306).

[1-3. Speech Recognition Dictionary Storing Unit]

With reference to FIG. 1, the example of the structure of the conversation control apparatus will be explained again.

Speech recognition dictionary storing unit 700 stores a character string corresponding to a standard speech signal. The speech recognizing unit 200, which has collated the speech signal with the dictionary stored in the speech recognition dictionary storing unit 700, specifies a character string corresponding to a word hypothesis, which corresponds to the speech signal, and outputs the specified character string to the conversation control unit 300 as a character string signal.

[1-4. Sentence Analyzing Unit]

Figure 4:
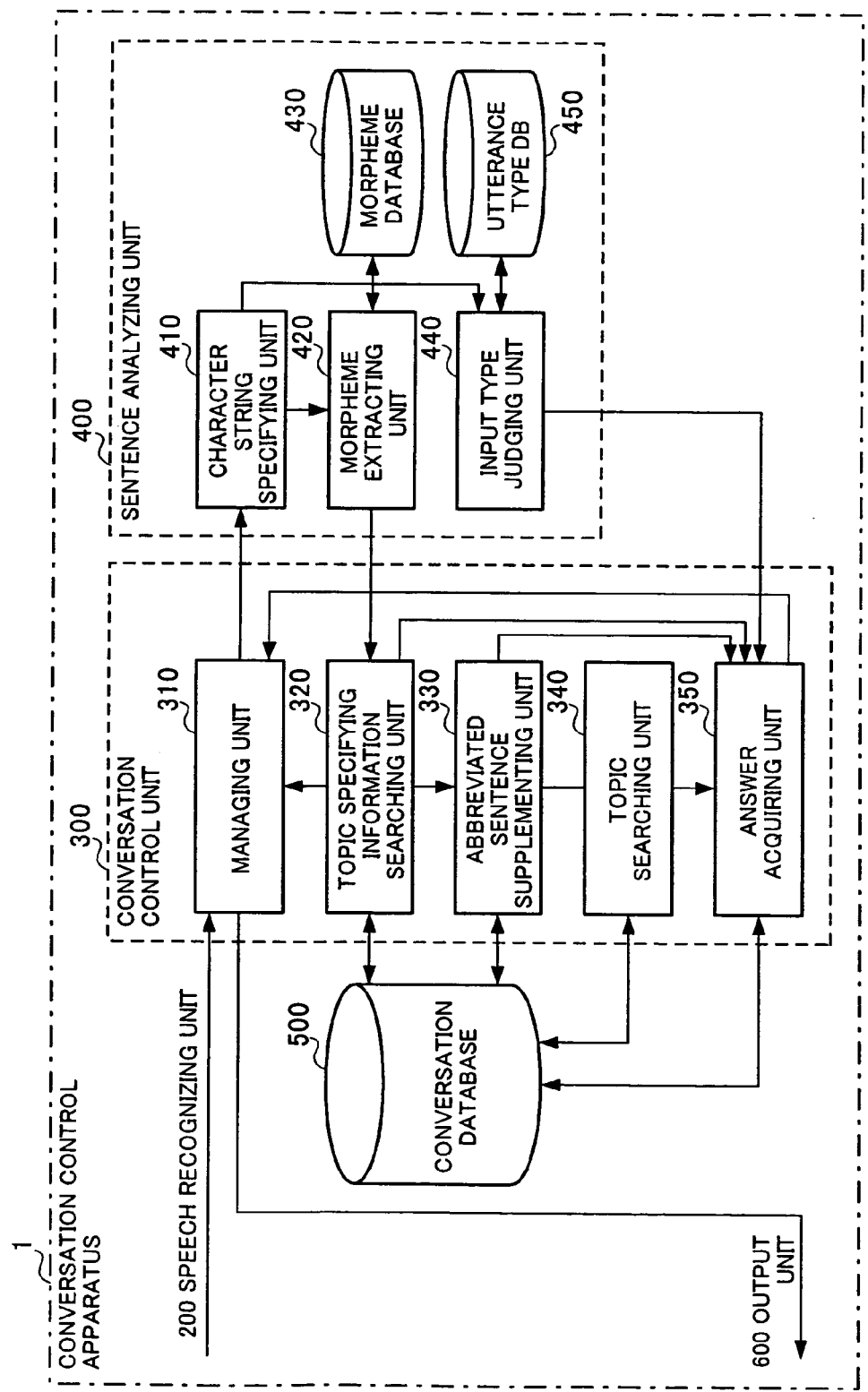
FIG. 4 is a functional block diagram showing an example of a detailed structure of the conversation control apparatus.

The sentence analyzing unit 400 analyzes a character string specified by the input unit 100 or the speech recognizing unit 200. In this embodiment, as shown in FIG. 4, this sentence analyzing unit 400 includes a character string specifying unit 410, a morpheme extracting unit 420, a morpheme database 430, an input type judging unit 440, and an utterance type database 450. The character string specifying unit 410 sections a series of character string, which is specified by the input unit 100 and the speech recognizing unit 200, into phrases. The phrase means one sectioned sentence that is obtained by sectioning a character string as small as possible so as not to change a grammatical meaning thereof. More specifically, when there is a time interval of a fixed length or more in the series of character string, the character string specifying unit 410 sections the character string in that part. The character string specifying unit 410 outputs the sectioned character strings to the morpheme extracting unit 420 and the input type judging unit 440. Note that it is assumed that the "character string" to be described below means a character string for each one phrase.

[1-5. Morpheme Extracting Unit]

Figure 5:
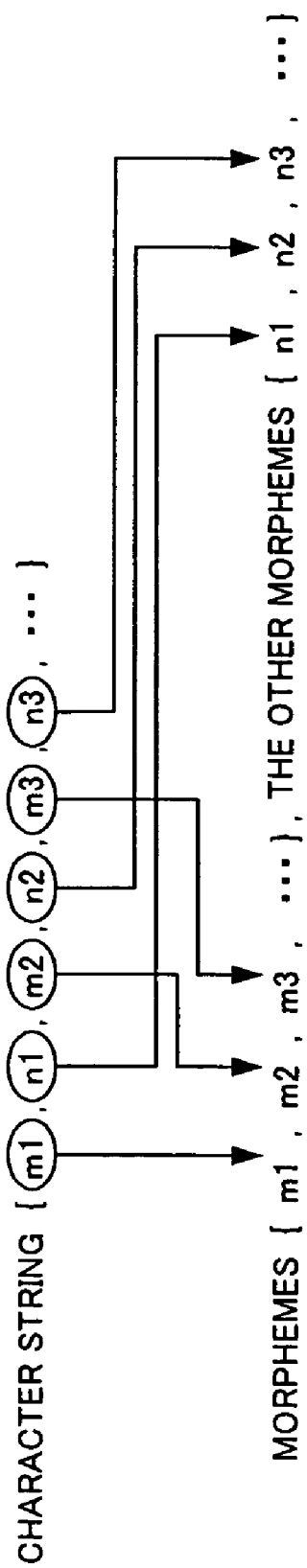
FIG. 5 is a diagram showing a correspondence relation between a character string and morphemes.

On the basis of the character string of one phrase sectioned by the character string specifying unit 410, the morpheme extracting unit 420 extracts each morpheme, which constitutes a minimum unit for a character string, as first morpheme information from the character string. Here, in this embodiment, the morpheme means a minimum unit for a word structure represented as a character string. As this minimum unit for a word structure, for example, there are parts of speech such as a noun, an adjective, and a verb. As shown in FIG. 5, each morpheme can be represented as $m1, m2, m3, \ldots$ in this embodiment. More specifically, as shown in FIG. 5, the morpheme extracting unit 420, to which a character string is inputted from the character string specifying unit 410, collates the inputted character string with a morpheme group stored in the morpheme database 430 in advance (this morpheme group is prepared as a morpheme dictionary in which an entry word, a reading, a part of speech, a conjugated form, and the like for each morpheme are described). The morpheme extracting unit 420, which has collated the inputted character string with the morpheme group, extracts morphemes $(m1, m2, \ldots)$, which match any one morpheme in the morpheme group stored in advance, out of the character string. As an example of morphemes $(n1, n2, n3, \ldots)$ excluding the extracted morphemes, there is an auxiliary verb or the like. This morpheme extracting unit 420 outputs the extracted morphemes to a topic specifying information searching unit 320 as first morpheme information. Note that the first morpheme information is not required to be structured. Here, "structuring" means classifying and arranging morphemes included in a character string on the basis of a part of speech or the like, for example, converting a character string, which is an uttered sentence, into data formed by arranging morphemes in a predetermined order such as "subject+object+predicative". It is needless to mention that, even if a structured first morpheme information is used, the first morpheme never prevents realization of this embodiment.

[1-6. Input Type Judging Unit]

The input type judging unit 440 judges a type of an uttered content (utterance type) on the basis of the character string specified by the character string specifying unit 410. In this embodiment, this utterance type means, for-example, a "type of an uttered sentence" shown in FIG. 6. Here, as shown in FIG. 6, the "type of an uttered sentence" is constituted by a declaration sentence (D), a time sentence (T), a location sentence (L), a negation sentence (N), and the like. The sentences in these types are formed as an affirmative sentence or an interrogative sentence. The "declaration sentence" means a sentence indicating an opinion or an idea of a user. In this embodiment, as shown in FIG. 6, as an example of the declaration sentence, there is a sentence "I like Sato" or the like. The "location sentence" means a sentence involving a locational concept. The "time sentence" means a sentence involving a temporal concept. The "negation sentence" means a sentence that is used when a declaration sentence is denied. Illustrative sentences for the "type of an uttered sentence" are as shown in FIG. 6.

In order to judge the "type of an uttered sentence", in this embodiment, as shown in FIG. 7, the input type judging unit 440 uses a definitional expression dictionary for judging whether a sentence is a declaration sentence, a negational expression dictionary for judging whether a sentence is a negation sentence, and the like. More specifically, the input type judging unit 440, to which a character string is inputted from the character string specifying unit 410, collates the inputted character string with the dictionaries stored in the utterance type database 450 on the basis of the character string. The input type judging unit 440, which has collated the character string and the dictionaries, extracts an element relating to the dictionaries out of the character string.

This input type judging unit 440 judges the "type of an uttered sentence" on the basis of the extracted element. For example, if an element describing a certain event is included in the character string, the input type judging unit 440 judges that the character string including the element is a declaration sentence. The input type judging unit 440 outputs the judged "type of an uttered sentence" to a replay acquiring unit 350.

[1-7. Conversation Database]

Figure 8:
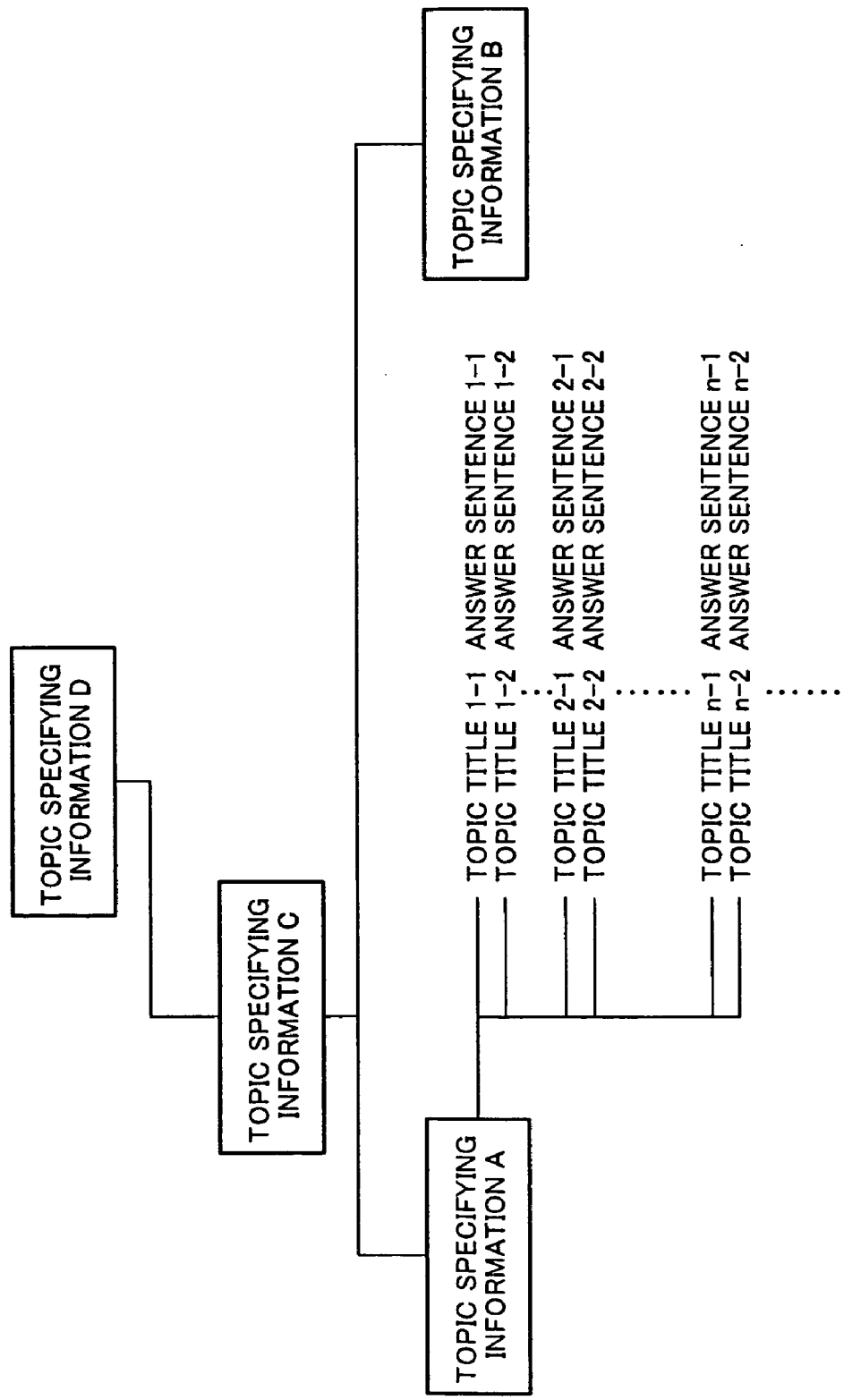
FIG. 8 is a diagram showing an example of a structure of a conversation database.

As shown in FIG. 8, the conversation database 500 associates plural topic titles (referred to as second morpheme information), which indicate morphemes consisting of one character, plural character strings, or a combination thereof, and replay sentences to a user with each other in advance, and stores the topic titles. In addition, plural answer types indicating types of the answer sentences are associated with the answer sentences.

Moreover, the conversation database 500 stores plural pieces of topic specifying information for specifying topics in advance. More specifically, in this embodiment, the "topic specifying information" means keywords that have relations with contents, which are expected to be inputted from the user, or the answer sentences answering the user. Plural topic titles are associated with this topic specifying information. In addition, the answer sentences answering the user are associated with the topic titles, respectively.

Figure 9:
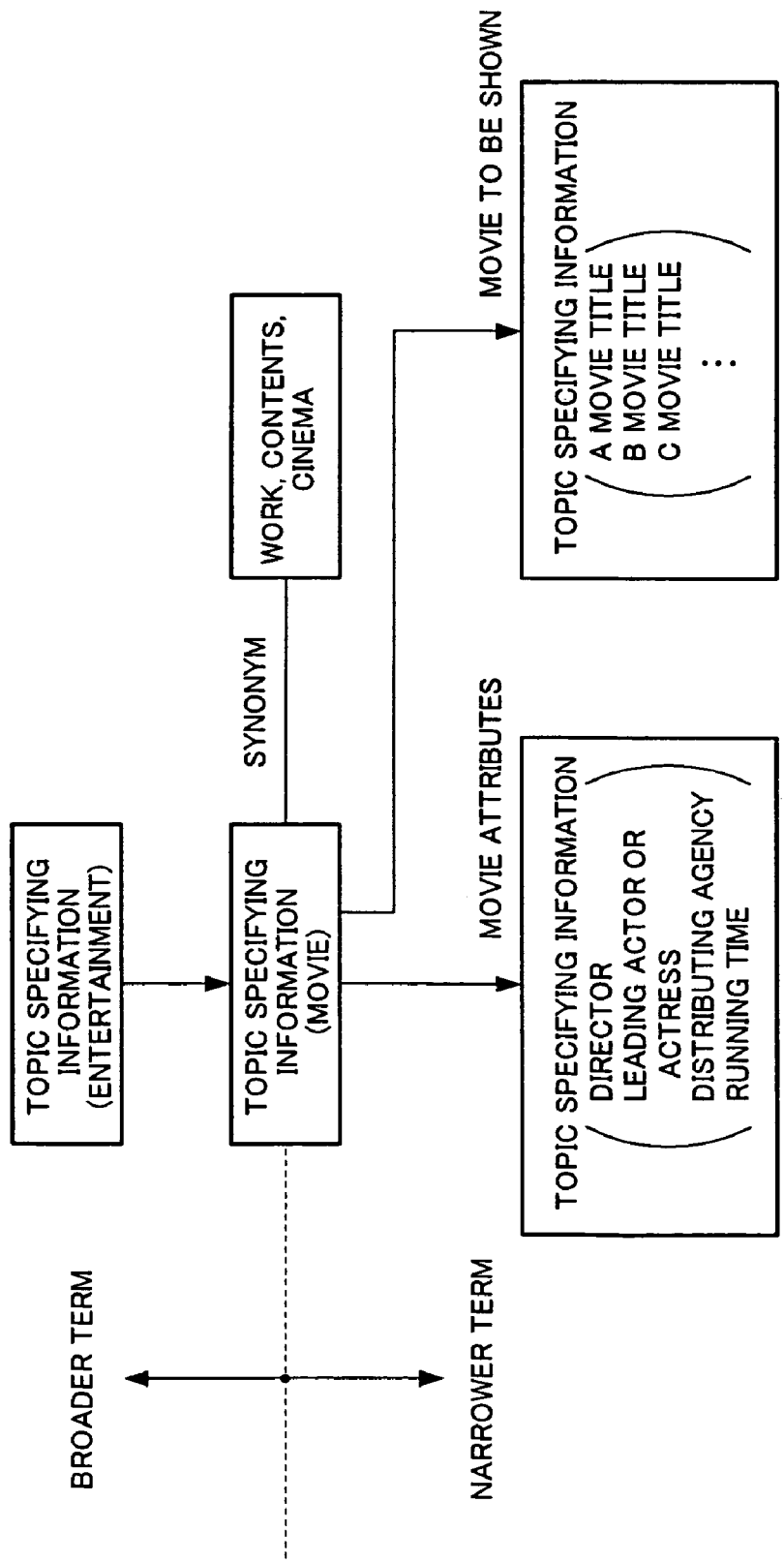
FIG. 9 is a diagram showing a relation among pieces of topic specifying information.

As shown in FIG. 9, in this embodiment, each piece of topic specifying information is stored such that relations of a broader term, a narrower term, a synonym, and an antonym between the topic specific information and the other pieces of topic specifying information are clarified. For example, topic specifying information ("entertainment"), which is a broader term with respect to topic specifying information ("movie"), is stored in an upper hierarchy with respect to the topic specifying information ("movie"). In addition, topic specifying information ("director of a movie", "leading actor or actress", etc.), which is a narrower term with respect to the topic specifying information ("movie"), is stored in a lower hierarchy with respect to the topic specifying information ("movie").

As shown in FIG. 10, a topic title (second morpheme information) is constituted by first specifying information, second specifying information, and third specifying information.

Here, in this embodiment, the "first specifying information" means a main morpheme constituting a topic. As an example of this first specifying information, there is a subject constituting a sentence.

In addition, in this embodiment, the "second specifying information" means a morpheme that have a close relation with the first specifying information. As an example of this second specifying information, there is an object word.

Further, in this embodiment, the "third specifying information" means a morpheme indicating movement for an object or a morpheme modifying a noun or the like. An example of this third specifying information, there is a verb, an adverb, or an adjective.

For example, when a subject is "A movie" and an adjective is "interesting", as shown in FIG. 10, the topic title (second morpheme information) is constituted by the morpheme "A movie" included in the first specifying information and the morpheme "interesting" included in the third specifying information. This topic title (A movie; *; interesting) has a meaning of "A movie is interesting".

Pieces of information in the parentheses constituting this topic title are the first specifying information, the second specifying information, and the third specifying information from the left in order. In addition, when there is no morpheme included in specifying information of a topic title, the part of the specifying information is indicated by "*". Note that the number of pieces of specifying information constituting the topic title is not limited to three, and additional pieces of specifying information may be included.

As shown in FIG. 11, in this embodiment, answer sentences are classified into types (answer types) such as declaration (D), time (T), location (L), and negation (N) in order to make an answer corresponding to a type of an uttered sentence of a user. In addition, an affirmative sentence is indicated by "A", and an interrogative sentence is indicated by "Q".

For example, when a topic title 1-1 is "Sato; *; like) {these are morphemes extracted from "I like Sato"}, as an answer sentence 1-1 corresponding to the topic title 1-1, there are (DA; a declaration affirmative sentence "I like Sato, too"), "TA; a time affirmative sentence "I like Sato at bat"), and the like. The answer acquiring unit 350 to be described later acquires one answer sentence associated with the topic title.

[1-8. Conversation Control Unit]

In this embodiment, as shown in FIG. 4, the conversation control unit 300 includes a managing unit 310, the topic specifying information searching unit 320, an abbreviated sentence supplementing unit 330, a topic searching unit 340, and the answer acquiring unit 350. The managing unit 310 controls the entire conversation control unit 300. These units constituting the conversation control unit 300 will be explained.

[1-8-1. Topic Specifying Information Searching Unit]

The topic specifying information searching unit 320 collates the first morpheme information extracted by the morpheme extracting unit 420 with the respective pieces of topic specifying information, and searches topic specifying information that matches the morphemes constituting the first morpheme information. More specifically, when the first morpheme information inputted from the morpheme extracting unit 420 is constituted by two morphemes, namely, "Sato" and "like", the topic specifying information searching unit 320 collates the inputted first morpheme information and the topic specifying information group.

In the case that the morpheme constituting the first morpheme information (e.g., "Sato") is included in a topic title of attention (a topic title searched previously), the topic specifying information searching unit 320, which has collated the first morpheme information and the topic specifying information group, outputs the topic title of attention to the replay acquiring unit 350. On the other hand, in the case that the morpheme constituting the first morpheme information is not included in the topic title of attention, the topic specifying information searching unit 320 determines user input sentence topic specifying information on the basis of the first morpheme information and outputs the inputted first morpheme information and the user input sentence topic specifying information to the abbreviated sentence supplementing unit 330.

[1-8-2. Abbreviated Sentence Supplementing Unit]

The abbreviated sentence supplementing unit 330 supplements the first morpheme information utilizing topic specifying information searched previously (hereinafter referred to as "topic of attention specifying information") and topic specifying information included in the replay sentence of the last time (hereinafter referred to as "answer sentence topic specifying information") to thereby generate plural kinds of supplemented first morpheme information. For example, if an uttered sentence is a sentence "I like", the abbreviated sentence supplementing unit 330 includes the topic of attention specifying information "Sato" in the first morpheme information "like" to generate the supplemented first morpheme information "Sato, like".

In other words, when it is assumed that the first morpheme information is "W" and a set of the topic of attention specifying information and the answer sentence topic specifying information is "D", the abbreviated sentence supplementing unit 330 includes the set "D" in the first morpheme information "W" to generate the supplemented morpheme information.

Consequently, for example, when a sentence constituted by using the first morpheme information is an abbreviated sentence and is not clear in meaning, the abbreviated sentence supplementing unit 330 can include the morpheme (e.g., "Sato") of the set "D" in the first morpheme information "W" using the set "D". As a result, the abbreviated sentence supplementing unit 330 can change the first morpheme information "like" to the supplemented first morpheme information "Sato, like". Note that the supplemented first morpheme information "Sato, like" corresponds to an uttered content "I like Sato".

In other words, even if an uttered content of a user is an abbreviated sentence, the abbreviated sentence supplementing unit 330 can supplement the abbreviated sentence using the set "D". As a result, even if a sentence constituted by the first morpheme information is an abbreviated sentence, the abbreviated sentence supplementing unit 330 can make the sentence appropriate.

In addition, the abbreviated sentence supplementing unit 330 searches a "topic title", which matches the first morpheme information after supplementation, on the basis of the set "D". When a "topic title", which matches the first morpheme information after supplementation, is found, the abbreviated sentence supplementing unit 330 outputs this "topic title" to the answer acquiring unit 350. The answer acquiring unit 350 can output an answer sentence, which is most suitable for the uttered content of the user, on the basis of the appropriate "topic title" searched by the abbreviated sentence supplementing unit 330.

Note that the morpheme of the set "D" is not the only morpheme that the abbreviated sentence supplementing unit 330 includes in the first morpheme information. On the basis of a topic title of attention, the abbreviated sentence supplementing unit 330 may include a morpheme, which is included in any one of the first specifying information, the second specifying information, or the third specifying information constituting the topic title, in the first morpheme information.

[1-8-3. Topic Searching Unit]

In the case that a topic title is not determined by the abbreviated sentence supplementing unit 330, the topic searching unit 340 collates the first morpheme information with topic titles corresponding to the user input sentence topic specifying information and searches a topic title, which is most suitable for the first morpheme information, out of the topic titles.

More specifically, on the basis of user input sentence topic specifying information and first morpheme information included in the inputted search instruction signal, topic searching unit 340, to which a search instruction signal is inputted from abbreviated sentence supplementing unit 330, searches a topic title, which is most suitable for the first morpheme information, out of topic titles associated with the user input sentence topic specifying information. The topic searching unit 340 outputs the searched topic title to the answer acquiring unit 350 as a search result signal.

As shown in FIG. 12, for example, since the topic specifying information "Sato" is included in the inputted first morpheme information "Sato, like", the topic searching unit 340 collates topic titles 1-1, 1-2, . . . associated with the topic specifying information "Sato" with the inputted first morpheme information "Sato, like".

This topic searching unit 340 searches a topic title 1-1 (Sato; *; like), which matches the inputted first morpheme information "Sato, like", out of the topic titles 1-1, 1-2, . . . on the basis of a result of the collation. The topic searching unit 340 outputs the searched topic title 1-1 (Sato; *; like) to the answer acquiring unit 350 as a search result signal.

[1-8-4. Answer Acquiring Unit]

On the basis of the topic title searched by the topic searching unit 340, the answer acquiring unit 350 acquires an answer sentence associated with the topic title. In addition, on the basis of the topic title searched by the topic searching unit 340, the replay acquiring unit 350 collates answer types associated with the topic title with the utterance type judged by the input type judging unit 440. The answer acquiring unit 350, which has collated the answer types with the utterance type, searches an answer type, which matches the judged utterance type, out of the answer types.

As shown in FIG. 12, for example, if the topic title searched by the topic searching unit 340 is the topic title 1-1 (Sato; *; like), the answer acquiring unit 350 specifies an answer type (DA), which matches the "type of an uttered sentence" (e.g., DA) judged by the input type judging unit 440, out of the answer sentences 1-1 (DA, TA, etc.) associated with the topic title 1-1. On the basis of the specified replay type (DA), the answer acquiring unit 350, which has specified this answer type (DA), acquires the answer sentence 1-1 ("I like Sato, too") associated with the replay type (DA) on the basis of the specified answer type (DA).

"A" in "DA", "TA, and the like means an affirmative form. Therefore, when "A" is included in an utterance type and an answer type, this means that a certain matter is affirmed. In addition, since types such as "DQ" and "TQ" can also be included in the utterance type and the answer type. "Q" in "DQ", "TQ", and the like means a question about a certain matter.

In the case that the utterance type consists of the question form "Q", an answer sentence associated with this utterance type is constituted by an affirmative form (A). As an example of an answer sentence created by this affirmative form (A), there is a sentence answering a questioned matter or the like.

For example, when an uttered sentence is "Have you operated a slot machine?", an utterance type for this utterance sentence is the question form (Q). As an example of an answer sentence associated with this question form (Q), there is a sentence "I have operated a slot machine" (the affirmative form (A)).

On the other hand, in the case that an utterance type consists of the affirmative form (A), an answer sentence associated with this utterance type is constituted by the question form (Q). As an example of an answer sentence created in this question form (Q), there is a question sentence asking about an uttered content again, a question sentence finding out a specific matter, or the like. For example, when an uttered sentence is "It is my hobby to play a slot machine", an utterance type for this uttered sentence is the affirmative form (A). An example of an answer sentence associated with this affirmative form (A) is, for example, there is a sentence "Isn't it your hobby to play pachinko?" (the question sentence "Q" finding out a specific matter).

The answer acquiring unit 350 outputs the acquired answer sentence to the managing unit 310 as an answer sentence signal. The managing unit 310, to which the answer sentence signal has been inputted from the answer acquiring unit 350, outputs the inputted answer sentence signal to the output unit 600.

The output unit 600 outputs the answer sentence acquired by the answer acquiring unit 350. As an example of this output unit 600, there is a speaker, a display, or the like. More specifically, the output unit 600, to which the answer sentence has been inputted from the managing unit 310, outputs an answer sentence, for example, "I like Sato, too" with speech on the basis of the inputted answer sentence.

[2. Conversation Control Method]

Figure 13:
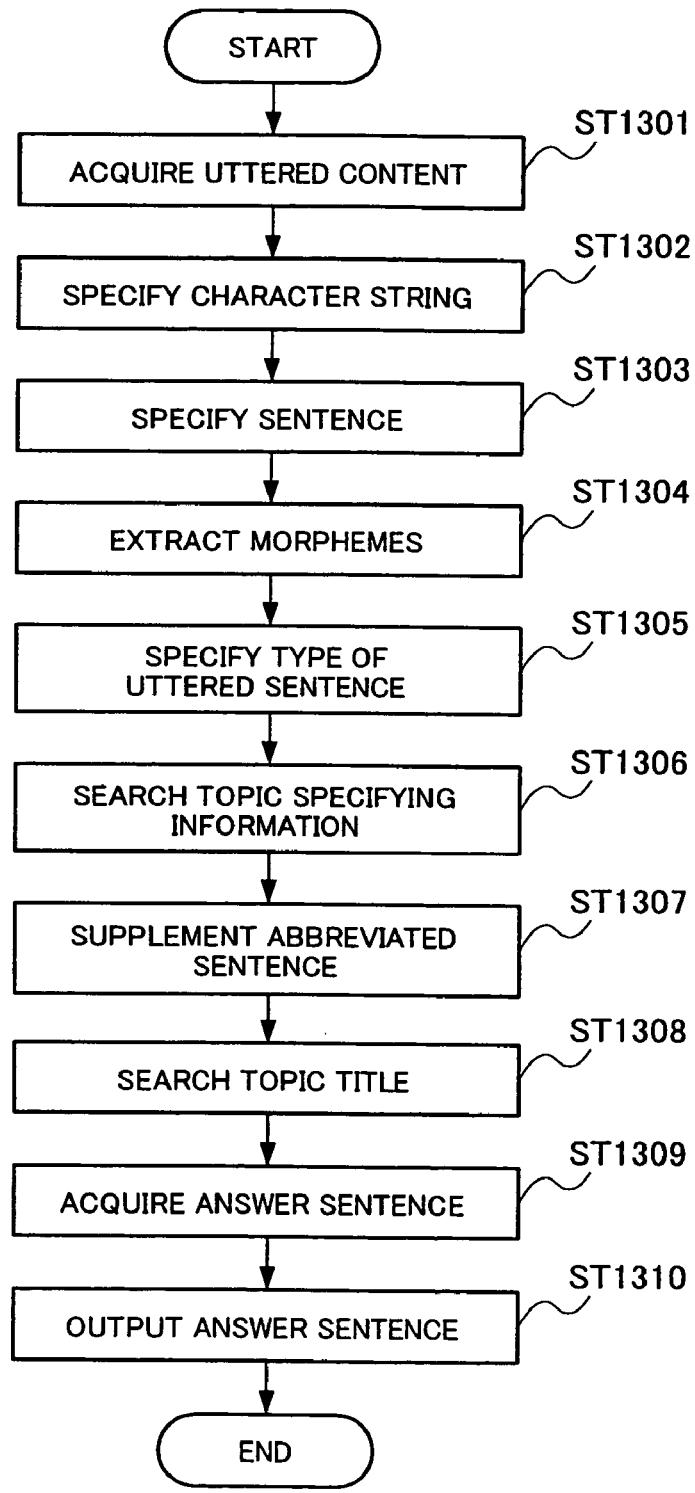
FIG. 13 is a flow diagram showing a procedure of a conversation control method.

A conversation control method, which is performed by the conversation control apparatus 1 having the above-described structure, can be carried out according to a procedure described below. FIG. 13 is a flow diagram showing a procedure for the conversation control method in accordance with this embodiment.

First, the input unit 100 performs a step of acquiring an uttered content from a user (step S1301). More specifically, the input unit 100 acquires speech constituting the uttered content of the user. The input unit 100 outputs the acquired speech to the speech recognizing unit 200 as a speech signal. Note that the input unit 100 may acquire a character string inputted from the user (e.g., character data inputted in a text form) rather than the speech from the user.

Subsequently, on the basis of the uttered content acquired by the input unit 100, the speech recognizing unit 200 performs a step of specifying a character string corresponding to the uttered content (step S1302). More specifically, the speech recognizing unit 200, to which the speech signal has been inputted from the input unit 100, specifies a word hypothesis (candidate) corresponding to the speech signal on the basis of the inputted speech signal. The speech recognizing unit 200 acquires a character string associated with the specified word hypothesis (candidate) and outputs the acquired character string to the conversation control unit 300 as a character string signal.

Then, the character string specifying unit 410 performs a step of sectioning a series of character string specified by the speech recognizing unit 200 into sentences (step S1303). More specifically, in the case that there is a time interval of a fixed length or more in the inputted series of character string, the character string specifying unit 410, to which a character string signal (or morpheme signal) has been inputted from the managing unit 310, sections the character string in that part. The character string specifying unit 410 outputs the sectioned character strings to the morpheme extracting unit 420 and the input type judging unit 440. Note that if the inputted character string is a character string inputted from a keyboard, the character string specifying unit 410 preferably sections the character string at parts where there are punctuation marks, spaces, or the like.

Thereafter, the morpheme extracting unit 420 performs a step of, on the basis of the character string specified by the character string specifying unit 410, extracting morphemes constituting a minimum unit of the character string as first morpheme information (step S1304). More specifically, the morpheme extracting unit 420, to which the character string has been inputted from the character string specifying unit 410, collates the inputted character string with the morpheme group that is stored in the morpheme database 430 in advance. Note that, in this embodiment, the morpheme group is prepared as a morpheme dictionary in which, for each morpheme belonging to respective classifications of parts of speech, an entry word, a reading, a part of speech, a conjugated form, and the like for the morpheme are described.

The morpheme extracting unit 420, which has collated the character string and the morpheme group, extracts morphemes ($m1, m2, \ldots$), which match morphemes included in the morpheme group stored in advance, out of the inputted character string. The morpheme extracting unit 420 outputs the extracted morphemes to the topic specifying information searching unit 320 as first morpheme information.

Subsequently, the input type judging unit 440 performs a step of judging a "type of an uttered sentence" on the basis of the morphemes constituting the sentence specified by the character string specifying unit 410 (step S1305). More specifically, the input type judging unit 440, to which the character string has been inputted from the character string specifying unit 410, collates the inputted character string and the dictionaries stored in the utterance type database 450 on the basis of the character string, and extracts an element relating to the dictionaries. The input type judging unit 440, which has extracted this element, judges to which "type of an uttered sentence" the extracted element belongs on the basis of the element. The input type judging unit 440 outputs the judged "type of an uttered sentence" (utterance type) to the answer acquiring unit 350.

Then, the topic specifying information searching unit 320 performs a step of comparing the first morpheme information extracted by the morpheme extracting unit 420 and the topic title of attention (step S1306).

If the morphemes constituting the first morpheme information and the topic title of attention match each other, the topic specifying information searching unit 320 outputs the topic title to the answer acquiring unit 350. On the other hand, if the morphemes constituting the first morpheme information and the topic title do not match each other, the topic specifying information searching unit 320 outputs the inputted first morpheme information and the user input topic specifying information to the abbreviated sentence supplementing unit 330 as a search instruction signal.

Thereafter, the abbreviated sentence supplementing unit 330 performs a step of, on the basis of the first morpheme information inputted from the topic specifying information searching unit 320, including the topic of attention specifying information and the answer sentence topic specifying information in the inputted first morpheme information (step S1307). More specifically, when it is assumed that the first morpheme information is "W" and a set of the topic of attention specifying information and the answer sentence topic specifying information is "D", the abbreviated sentence supplementing unit 330 includes elements of the topic specifying information "D" in the first morpheme information "W", generates the supplemented first morpheme information, collates the supplemented first morpheme information with all topic titles associated with the set "D", and searches to find if there is a topic title that matches the supplemented first morpheme information. If there is a topic title that matches the supplemented first morpheme information, the abbreviated sentence supplementing unit 330 outputs the topic title to the answer acquiring unit 350. On the other hand, if a topic title, which matches the supplemented first morpheme information, has not been found, the abbreviated sentence supplementing unit 330 passes the first morpheme information and the user input sentence topic specifying information to the topic searching unit 340.

Subsequently, the topic searching unit 340 performs a step of collating the first morpheme information with the user input sentence topic specifying information and searching a topic title suitable for the first morpheme information out of the topic titles (step S1308). More specifically, on the basis of the user input sentence topic specifying information and the first morpheme information included in the inputted search instruction signal, the topic searching unit 340, to which the search instruction signal has been inputted from the abbreviated sentence supplementing unit 330, searches a topic title suitable for the first morpheme information out of the topic titles associated with the user input sentence topic specifying information. The topic searching unit 340 outputs a topic title, which is obtained as a result of the search, to the answer acquiring unit 350 as a search result signal.

Subsequently, on the basis of the topic title that is searched by the topic specifying information searching unit 320, the abbreviated sentence supplementing unit 330, or the topic searching unit 340, the answer acquiring unit 350 collates the judged utterance type of the user with answer types associated with the topic title. The answer acquiring unit 350, which has collated the utterance type and the answer types, searches an answer type, which matches the judged utterance type, out of the answer types (step S1309).

More specifically, the answer acquiring unit 350, to which the search result signal is inputted from the topic searching unit 340 and the "type of an uttered sentence" is inputted from the input type judging unit 440, specifies an answer type, which matches the "type of an uttered sentence" (DA, etc.), out of an answer type group associated with the "topic title" corresponding to the inputted search result signal on the basis of the "topic title" and the inputted "type of an uttered sentence".

This answer acquiring unit 350 acquires an answer sentence associated with the specified answer type. The answer acquiring unit 350 outputs the acquired answer sentence to the output unit 600 via the management unit 310. The output unit 600, to which the answer sentence is inputted from the management unit 310, outputs the inputted answer sentence (step S1310).

[3. Advantages of the Conversation Control Apparatus and the Conversation Control Method]

According to the invention (the conversation control apparatus and the conversation control method) in accordance with this embodiment having the above-described structure, the first morpheme information is a collection of main morphemes constituting an uttered content of a user. Thus, the answer acquiring unit 350 can acquire one answer sentence taking into account meaning and a content of a sentence constituted by the main morphemes. Consequently, the answer acquiring unit 350 can acquire an answer sentence that is more suitable for an uttered content than an answer sentence that is obtained by, with the entire uttered content as a keyword, searching an answer sentence associated with the keyword.

In addition, since the topic searching unit 340 searches a topic title that matches first morpheme information, it is unnecessary to search a topic title that completely matches an uttered content of a user. Consequently, a developer, who develops the conversation control apparatus 1, is not required to cause the conversation control apparatus 1 to store all topic titles that completely match the first morpheme information, and a capacity of a storage unit can be reduced.

Further, in order to search a topic title approximate to first morpheme information, the topic searching unit 340 only has to collate the first morpheme information with topic titles associated with "topic specifying information" and is not required to collate the first morpheme information with "all" the topic titles. As a result, the topic searching unit 340 can search the topic title approximate to the first morpheme information in a short time (pinpoint search). In addition, since the topic searching unit 340 can perform the pinpoint search, on the basis of the topic title that is searched in a short time, the answer acquiring unit 350 can acquire an answer sentence associated with the topic title in a short time.

Furthermore, the answer acquiring unit 350 can search an answer type, which matches a judged utterance type, out of answer types associated with topic titles and acquire an answer sentence associated with the searched answer type. Consequently, since the answer acquiring unit 350 can acquire an answer sentence that matches utterance types constituting an uttered content, the answer acquiring unit 350 can answer to an uttered content of a user more accurately.

In addition, if an uttered content of a user is an abbreviated sentence, the abbreviated sentence supplementing unit 330 can make topic specifying information, which was searched by the topic specifying information searching unit 320 last time, included in first morpheme information corresponding to the uttered content. Consequently, even if the uttered content of the user is an abbreviated sentence, the abbreviated sentence supplementing unit 330 can supplement the abbreviated sentence by using the topic specifying information searched last time. As a result, even if a sentence constituted by the first morpheme information is an abbreviated sentence, the abbreviated sentence supplementing unit 330 can make the sentence appropriate.

Moreover, the topic searching unit 340 can search an appropriate topic title relating to first morpheme information after supplementation on the basis of the first morpheme information. Thus, the answer acquiring unit 350 can output an answer sentence suitable for an uttered content on the basis of the appropriate topic title searched by the topic searching unit 340.

Finally, even if input information from a user is an abbreviated sentence, the conversation control apparatus 1 can estimate what the abbreviated sentence means using search results in the past without using a function of a neuronetwork, an AI (Artificial Intelligence), or the like and can search an appropriate answer sentence on the basis of the estimated meaning and content. In addition, a developer of the conversation control apparatus 1 is not required to install the neuronetwork or the AI. Thus, the developer can establish a system for the conversation control apparatus 1 simply and in a short time.

[B. Second Embodiment]

Next, a conversation control apparatus in accordance with a second embodiment of the present invention will be explained. As in the conversation control apparatus 1 in accordance with the first embodiment shown in FIG. 1, the conversation control apparatus in accordance with the second embodiment includes the input unit 100, the speech recognizing unit 200, the conversation control unit 300, the sentence analyzing unit 400, the conversation database 500, the output unit 600, and the speech recognition dictionary storing unit 700. A conversation control apparatus 1' in accordance with the second embodiment is different from the conversation control apparatus 1 in accordance with the first embodiment in that the speech recognizing unit 200 sends morpheme information instead of a character string signal to the conversation control unit 300.

Figure 14:
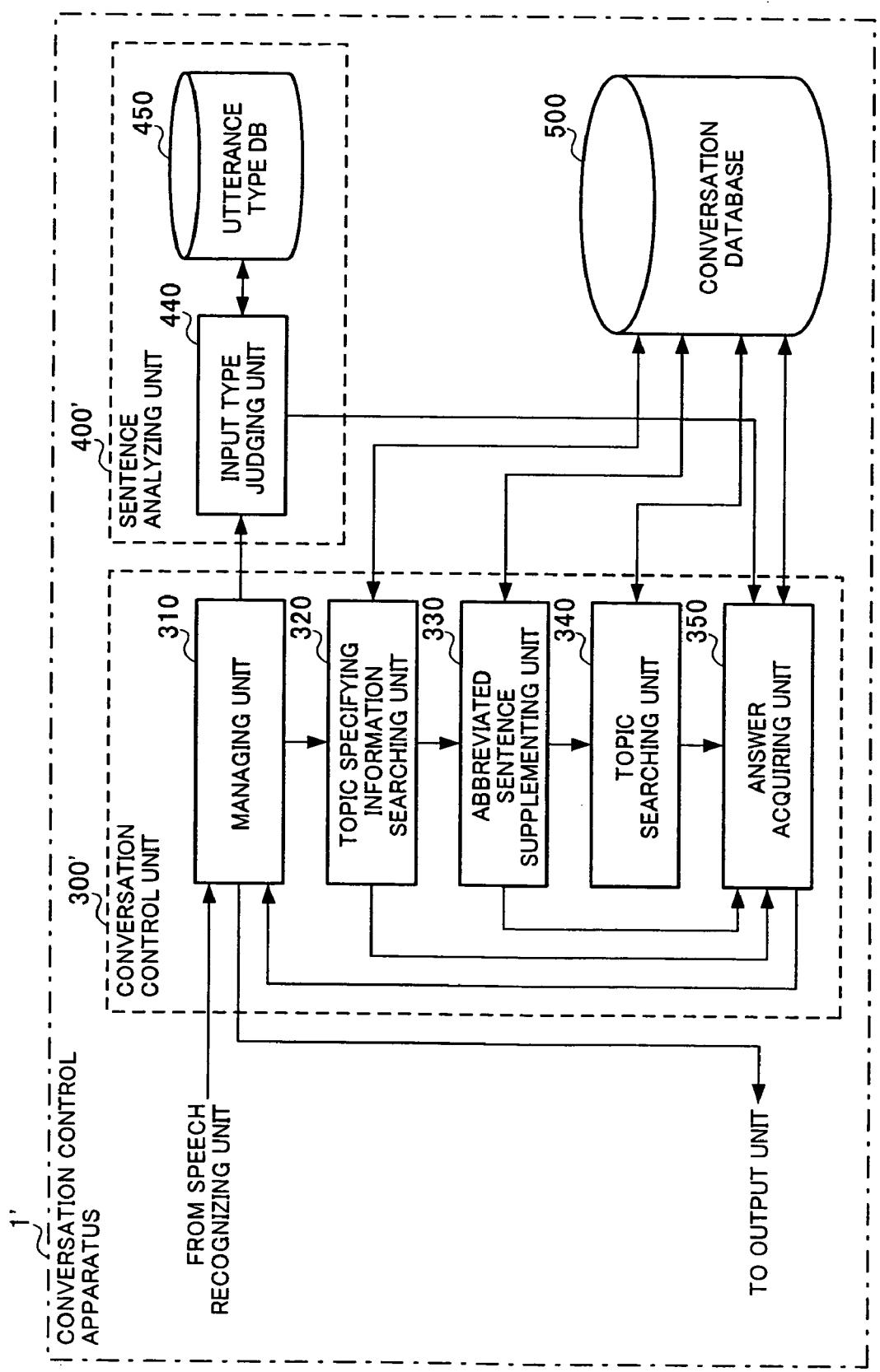
FIG. 14 is a partial functional block diagram showing an example of a detailed structure of a conversation control apparatus in accordance with a second embodiment of the present invention.

FIG. 14 shows a partial functional block diagram showing an example of a detailed structure of the conversation control apparatus in accordance with the second embodiment.

In this embodiment, a conversation control unit 300' includes the managing unit 310, the topic specifying information searching unit 320, the abbreviated sentence supplementing unit 330, the topic searching unit 340, and the answer acquiring unit 350. Functions and actions of the managing unit 310, the topic specifying information searching unit 320, the abbreviated sentence supplementing unit 330, the topic searching unit 340, and the answer acquiring unit 350 are substantially the same as those in the first embodiment.

Upon receiving morpheme information from the speech recognizing unit 200, the managing unit 310 passes the morpheme information to a sentence analyzing unit 400' to cause the sentence analyzing unit 400' to specify a type of an uttered content (uttered sentence type) and passes this morpheme information to the topic specifying information searching unit 320 as first morpheme information.

The topic specifying information searching unit 320 compares the first morpheme information and a topic title determined previously (referred to as "topic title of attention") to check if the first morpheme information and the topic title match. If the first morpheme information and the topic title of attention match, the topic specifying information searching unit 320 passes the topic title of attention to the answer acquiring unit 350. The answer acquiring unit 350 extracts answer sentence candidates corresponding to the received topic title from the conversation database 500, selects an answer sentence, which matches an input type received from the input type judging unit 440, in the extracted answer sentence candidates, and outputs the answer sentence to the managing unit 310. On the other hand, if the first morpheme information and the topic title of attention do not match, the topic specifying information searching unit 320 generates topic specifying information (referred to as "user input sentence topic specifying information") included in the first morpheme information and passes the first morpheme information, the user input sentence topic specifying information, topic of attention specifying information, and answer sentence topic specifying information (topic specifying information included in an answer sentence returned to a user last time) to the abbreviated sentence supplementing unit 330.

The abbreviated sentence supplementing unit 330 extracts all topic titles, which are associated with the first morpheme information, the user input sentence topic specifying information, the topic of attention specifying information, and the answer sentence topic specifying information, from the conversation database 500. Then, the abbreviated sentence supplementing unit 330 creates plural kinds of supplemented first morpheme information (hereinafter referred to as "supplemented first morpheme information") by adding these pieces of topic specifying information to the first morpheme information, collates the respective supplemented first morpheme information with the topic titles, searches a topic title matching the supplemented first morpheme information, and passes the topic title to the answer acquiring unit 350. The answer acquiring unit 350 extracts answer sentence candidates corresponding to the received topic title from the conversation database 500, selects an answer sentence, which matches the input type received from the input type judging unit 440, in the extracted answer sentence candidates, and outputs the answer sentence to the managing unit 310. On the other hand, if there is not topic title matching the supplemented first morpheme information, the abbreviated sentence supplementing unit 330 passes the first morpheme information and the user input sentence topic specifying information to the topic searching unit 340.

The topic searching unit 340 receives a first morpheme information group, and at the same time, extracts topic titles associated with the user input sentence topic specifying information from the conversation database 500, compares the topic titles with the first morpheme information group, and checks if there is a topic title suitable for the first morpheme information. If a topic title suitable for the first morpheme information group is found, the topic searching unit 340 passes the topic title to the answer acquiring unit 350. On the other hand, if a topic title suitable for the first morpheme information cannot be found, the topic searching unit 340 informs the answer acquiring unit 350 that an answer is unavailable or unknown. The answer acquiring unit 350 selects an answer sentence, which is defined as an answer to be made when an answer is unavailable or unknown in advance, and outputs the answer sentence to the managing unit 310.

The answer acquiring unit 350 extracts answer sentence candidates, which correspond to the topic title received from the topic specifying information searching unit 320, the abbreviated sentence supplementing unit 330, or the topic searching unit 340, from the conversation database 500. Then, the answer acquiring unit 350 selects an answer sentence, which matches the input type (type of an uttered sentence) received from the input type judging unit 440, in the extracted answer sentence candidates and outputs the answer sentence to the managing unit 310.

The sentence analyzing unit 400' of the conversation control apparatus 1' in accordance with the second embodiment is different from the sentence analyzing unit 400 in the first embodiment in that the sentence analyzing unit 400' includes the input type judging unit 440 and the utterance type database 450 but does not include the character string judging unit 410, the morpheme extracting unit 420, and the morpheme database 430. This is because morpheme information is supplied to the sentence analyzing unit 400' instead of character string information from the conversation control unit 300'.

According to the second embodiment, a character string is subjected to morpheme analysis in the sentence analyzing unit 400', which makes it unnecessary to create first morpheme information. Thus, a load applied to the conversation control apparatus 1' is reduced, and it becomes possible to realize faster conversation control processing compared with the first embodiment.

[4. Modifications and Others]

(1) Note that the speech recognizing unit, the speech recognition apparatus, the conversation control apparatus, the speech recognition method, and the conversation control method in accordance with the above-described embodiments are not limited to be used in an apparatus with an object of conversation (conversation robot, etc.) but can also be used in a game machine.

Figure 15:
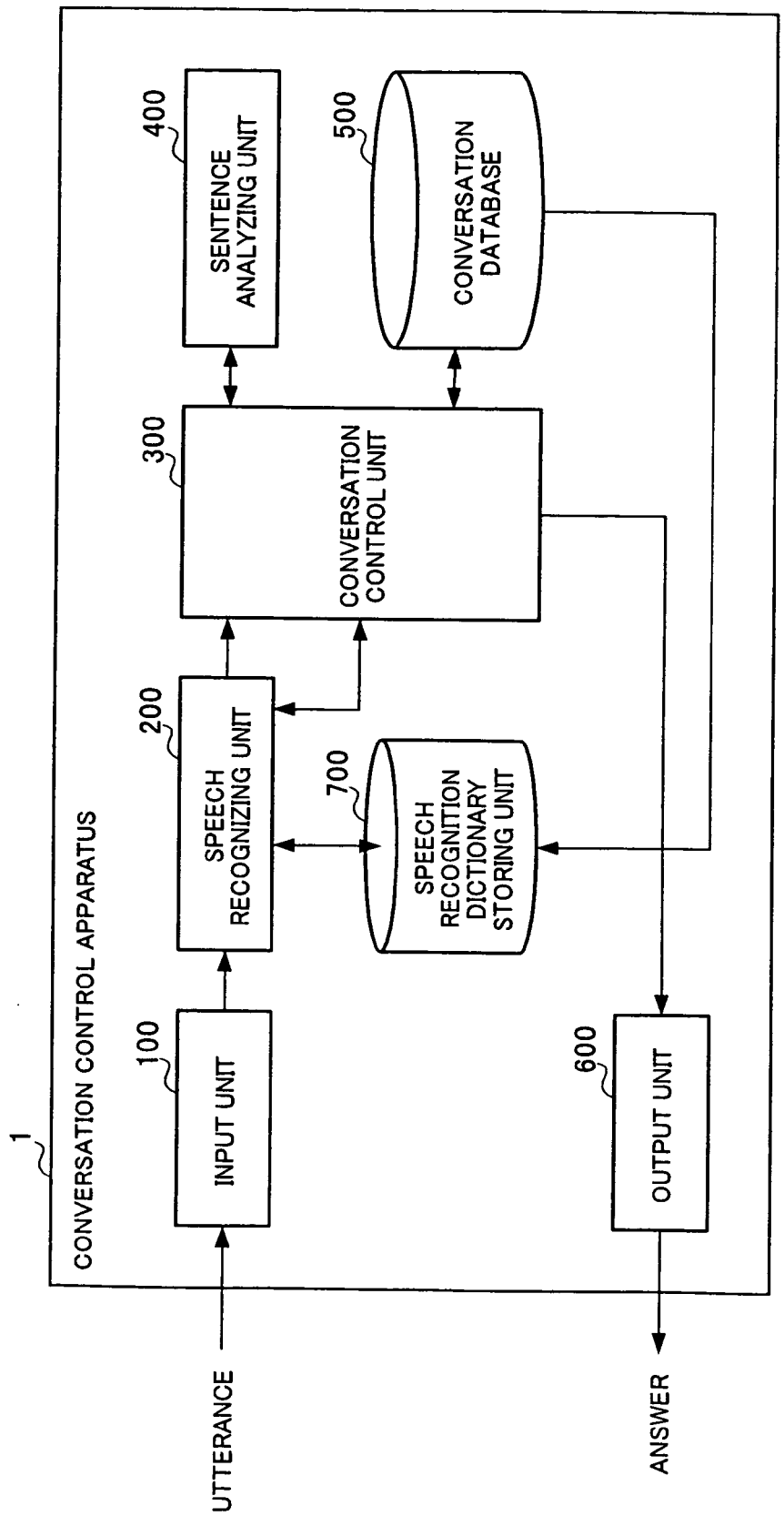
FIG. 15 is a functional block diagram showing another example of the structure of the conversation control apparatus.

(2) In the second embodiment of the present invention, it is possible to establish a speech recognition dictionary with higher recognition accuracy by reflecting the conversation database 500 to the speech recognition dictionary storing unit 700 as a language model. FIG. 15 shows an example of a structure of the conversation control apparatus 1 in which the conversation database 500 is reflected on the speech recognition dictionary storing unit 700 as a language model. In this example, topic titles accumulated in the conversation database 500 can be added to the speech recognition dictionary storing unit 700 as a language model at appropriate timing. This makes it possible to reflect a language model conforming to a topic of conversation on the speech recognition dictionary storing unit 700, and further improvement in speech recognition accuracy can be expected.

5. Advantages of the Invention]

An aspect of the present invention makes it possible to perform speech recognition on the basis of a conversation history in addition to an existing language model. Thus, since an utterance candidate conforming to a conversation range is selected preferentially after wrong recognition is prevented, it becomes possible to improve a speech recognition rate.

In another aspect of the present invention, an utterance candidate is selected preferentially in accordance only with a meaningful "conversation history" excluding a "meaningless conversation history". Thus, an utterance candidate, which conforms to a topic more, can be selected preferentially. As a result, it becomes possible to further improve a speech recognition rate.

Additional advantages and modifications will readily occur to those skilled in the art. Therefore, the invention in its broader aspects is not limited to the specific details or representative embodiments shown and described herein. Accordingly, various modification may be made without departing from the spirit or scope of the general inventive concept as defined by the appended claims and their equivalents.

What is claimed is:

1. A speech recognition apparatus comprising:
   a speech recognizing unit that receives a speech signal;
   a speech recognition dictionary storing unit that has stored therein a language model for determining candidates corresponding to said speech signal;
   a conversation database that has stored therein plural pieces of topic specifying information; and
   a conversation history storing memory that stores a conversation history comprised of a history of conversation subjects,
   wherein:
   the speech recognizing unit has:
   a word collating unit that outputs plural candidates with reference to said speech recognition dictionary storing unit on the basis of the inputted speech signal; and
   a candidate determining unit that compares the plural candidates outputted from the word collating unit with topic specifying information corresponding to the conversation history with reference to said conversation database and outputs any one candidate as a recognition result on the basis of a result of the comparison, wherein said candidate determining unit compares said plural candidates and topic specifying information corresponding to the conversation history with reference to said conversation database, judges whether there is a candidate, which matches the topic specifying information corresponding to the conversation history, in said plural candidates, and if there is a candidate matching the topic specifying information, outputs the candidate as a recognition result.

2. The speech recognition apparatus according to claim 1, wherein:
   said conversation database has stored therein first topic specifying information relating to subjects of conversation and second topic specifying information not relating to the subjects of conversation, and
   said candidate determining unit compares said plural candidates with the first topic specifying information corresponding to a conversation history and outputs any one of said plural candidates as a recognition result.

3. The speech recognition apparatus according to claim 1, wherein:
   the speech recognition apparatus further includes a candidates narrowing-down unit, and
   wherein, as a result of comparing said plural candidates and the topic specifying information corresponding to the conversation history, if there is no candidate matching the topic specifying information, said candidate determining unit requests said candidates narrowing-down unit to narrow down the candidates, and said candidates narrowing-down unit outputs a candidate, which has a maximum likelihood, among said plural candidates as a recognition result in response to this request.

4. The speech recognition apparatus according to claim 3, wherein:
   said conversation database has stored therein first topic specifying information relating to subjects of conversation and second topic specifying information not relating to the subjects of conversation, and
   said candidate determining unit compares said plural candidates and the first topic specifying information corresponding to a conversation history and outputs any one of said plural candidates as a recognition result.

5. A computer readable medium storing a program, said program comprised of instructions for causing a computer to function as the speech recognition apparatus according to claim 1.

6. A speech recognition method for outputting characters or a character string corresponding to an inputted speech as a recognition result, comprises the steps of:
   analyzing acoustic characteristics on the basis of a speech signal obtained from the inputted speech;
   outputting plural candidates on the basis of said acoustic characteristics;
   acquiring topic specifying information corresponding to a conversation history comprised of a stored history of conversation subjects; and
   comparing said plural candidates and the acquired topic specifying information and outputs any one of said plural candidates as a recognition result, wherein in the step of outputting a candidate as a recognition result, it is judged whether there is a candidate, which matches the topic specifying information corresponding to the conversation history, in said plural candidates, and if there is a candidate matching the topic specifying information, the candidate is outputted as the recognition result.

7. The speech recognition method according to claim 6, wherein:
   said topic specifying information includes first topic specifying information relating to the subjects of conversation and second topic specifying information not relating to the subjects of conversation, and
   the topic specifying information, which is compared with said plural candidate in the step of outputting a candidate as a recognition result, is limited to the first topic specifying information.

8. The speech recognition method according to claim 6, wherein:

as a result of comparing said plural candidates and the topic specifying information corresponding to the conversation history in the step of outputting a candidate as a recognition result, if there is no candidate matching the topic specifying information, a candidate having a maximum likelihood among said plural candidates is outputted as the recognition result.

9. The speech recognition method according to claim 8, wherein:
said topic specifying information includes first topic specifying information relating to subjects of conversation and second topic specifying information not relating to the subjects of conversation, and
the topic specifying information, which is compared with said plural candidate in the step of outputting a candidate as a recognition result, is limited to the first topic specifying information.

10. A computer readable medium storing a program, said program comprised of instructions for causing a computer to execute the speech recognition method according to claim 6.

11. An automatic conversation apparatus comprising:
a speech recognizing unit that receives a speech signal and outputs characters or a character string corresponding to the speech signal as a recognition result;
a speech recognition dictionary storing unit that has stored therein a language model for determining candidates corresponding to the speech signal;
a conversation database that has stored therein plural pieces of topic specifying information;
a sentence analyzing unit that analyzes the characters or the character string outputted from said speech recognizing unit; and
a conversation control unit that stores a conversation history and acquires an answer sentence on the basis of an analysis result of said sentence analyzing unit, wherein:
said speech recognizing unit includes:
a word collating unit that outputs plural candidates with reference to said speech recognition dictionary storing unit on the basis of the inputted speech signal; and
a candidate determining unit that compares the plural candidates outputted from said word collating unit with topic specifying information corresponding to the conversation history with reference to said conversation database and outputs any one candidate as a recognition result on the basis of a result of the comparison.

12. The automatic conversation apparatus according to claim 11, wherein:
said conversation database has stored therein first topic specifying information relating to subjects of conversation and second topic specifying information not relating to the subjects of conversation, and
said candidate determining unit compares said plural candidates and the first topic specifying information corresponding to a conversation history and outputs any one of said plural candidates as a recognition result.

13. A computer readable medium storing program, said program comprised of instructions for causing a computer to function as the automatic conversation apparatus according to claim 11.

14. An automatic conversation method for outputting a response sentence in response to an input speech, comprising the steps of:
analyzing acoustic characteristics on the basis of a speech signal obtained from the inputted speech;
outputting plural candidates on the basis of said acoustic characteristics;

acquiring topic specifying information corresponding to a conversation history stored in advance;
comparing said plural candidates and the acquired topic specifying information and outputs any one of said plural candidates as a recognition result; and
analyzing said recognition result and outputs an answer sentence associated with the topic specifying information corresponding to said conversation history on the basis of said recognition result.

15. The automatic conversation method according to claim 14, wherein:
said topic specifying information includes first topic specifying information relating to subjects of conversation and second topic specifying information not relating to the subjects of conversation, and
the topic specifying information, which is compared with said plural candidate in the step of outputting a candidate as a recognition result, is limited to the first topic specifying information.

16. A computer readable medium storing a program, said program comprised of instructions for causing a computer to execute the automatic conversation method according to claim 14.

17. A speech recognition apparatus comprising:
speech recognizing means that receives a speech signal;
speech recognition dictionary storing means that has stored therein a language model for determining candidates corresponding to said speech signal;
conversation database means that has stored therein plural pieces of topic specifying information; and
conversation history storing means that stores a conversation history, wherein:
the speech recognizing means has:
collating means that outputs plural candidates with reference to said speech recognition dictionary storing means on the basis of the inputted speech signal; and
candidate determining means that compares the plural candidates outputted from the collating means with topic specifying information corresponding to the conversation history with reference to said conversation database means and outputs any one candidate as a recognition result on the basis of a result of the comparison.

18. An automatic conversation apparatus comprising:
speech recognizing means that receives a speech signal and outputs characters or a character string corresponding to the speech signal as a recognition result;
speech recognition dictionary storing means that has stored therein a language model for determining candidates corresponding to the speech signal;
conversation database means that has stored therein plural pieces of topic specifying information;
sentence analyzing means that analyzes the characters or the character string outputted from said speech recognizing means; and
conversation control means that stores a conversation history and acquires an answer sentence on the basis of an analysis result of said sentence analyzing means, wherein:
said speech recognizing means has:
collating means that outputs plural candidates with reference to said speech recognition dictionary storing means on the basis of the inputted speech signal; and
candidate determining means that compares the plural candidates outputted from said collating means with topic specifying information corresponding to the conversation history with reference to said conversation database means and outputs any one candidate as a recognition result on the basis of a result of the comparison.

19. A speech recognition method for outputting characters or a character string corresponding to an inputted speech as a recognition result, comprising the steps of:

analyzing acoustic characteristics of the inputted speech to generate a characteristic parameter;

selecting a plurality of word hypotheses and calculating a corresponding likelihood of each word hypothesis by comparing the characteristic parameter with acoustic and language models in a speech recognition dictionary;

acquiring topic specifying information corresponding to a stored history of conversation subjects; and comparing each of said selected word hypotheses to determine whether there is a word hypothesis that corresponds to the acquired topic specifying information, outputting the recognition result, wherein if there is a word hypothesis matching the topic specifying information then the word hypothesis matching the topic specifying information is outputted as the recognition result, and if there is no candidate matching the topic specifying information then the word hypothesis with the greatest likelihood is outputted as the recognition result.

* * * * *